US012506713B2

(12) United States Patent
Garner et al.

(10) Patent No.: US 12,506,713 B2
(45) Date of Patent: Dec. 23, 2025

(54) DISTRIBUTED COMPUTING TO IMPLEMENT PRIVACY POLICIES ON EDGE DEVICES

(71) Applicant: Roku, Inc., San Jose, CA (US)

(72) Inventors: Gregory Garner, Key Colony Beach, FL (US); Sunil Ramesh, Saratoga, CA (US); Michael Patrick Cutter, Golden, CO (US); Carl Sassenrath, Reno, NV (US); Bollapragada Manohar, San Jose, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 137 days.

(21) Appl. No.: 18/401,110

(22) Filed: Dec. 29, 2023

(65) Prior Publication Data

US 2025/0220000 A1    Jul. 3, 2025

(51) Int. Cl.
*H04L 29/06* (2006.01)
*H04L 9/40* (2022.01)

(52) U.S. Cl.
CPC .............. *H04L 63/04* (2013.01); *H04L 63/10* (2013.01)

(58) Field of Classification Search
None
See application file for complete search history.

(56) References Cited

U.S. PATENT DOCUMENTS 11,968,281 B2 * 4/2024 Klein ...................... H04L 67/63

2019/0317825 A1 * 10/2019 O'Neal ................. G06F 9/5077
2020/0159961 A1 * 5/2020 Smith ...................... G06N 3/08
2021/0136006 A1 * 5/2021 Casey ................. H04L 67/1021
(Continued)

FOREIGN PATENT DOCUMENTS

WO    2022268656 A1    12/2022

OTHER PUBLICATIONS

Samadian, Reza; Noorhosseini, Majid. Improvements in Support Vector Machine based localization in Wireless Sensor Networks. 2010 5th International Symposium on Telecommunications. https://ieeexplore.ieee.org/stamp/stamp.jsp?tp=&arnumber=5734030 (Year: 2010).*

(Continued)

*Primary Examiner* — Jeremiah L Avery
(74) *Attorney, Agent, or Firm* — Straylight LLP

(57) ABSTRACT

Disclosed herein are computing system, apparatus, article of manufacture, method and/or computer program product embodiments, and/or combinations and sub-combinations thereof, for distributing processing of sensor data. For example, a computing system may be configured to determine processing capabilities of each of one or more edge devices of a network. Additionally, the computing system may determine available processing resources of each of the one or more edge devices. Moreover, the computing system may select, from the one or more edge devices, a target device, based on the processing capabilities of each of the one or more edge devices and the available processing resources of each of the one or more edge devices. Further, the computing system may communicate with the target device to cause the target device to generate one or more feature vectors based on sensor data generated by the target device.

20 Claims, 7 Drawing Sheets

(56) References Cited

U.S. PATENT DOCUMENTS

| | | | |
|---|---|---|---|
| 2023/0177385 A1* | 6/2023 | Nagalapatti | G06N 3/042 |
| | | | 706/12 |
| 2023/0222454 A1* | 7/2023 | Cella | G06Q 10/06315 |
| | | | 705/28 |
| 2023/0289169 A1* | 9/2023 | Gottin | G06N 20/00 |
| 2023/0297825 A1* | 9/2023 | Balevi | G06N 3/098 |
| | | | 706/25 |
| 2024/0054387 A1* | 2/2024 | Bai | H04W 72/25 |

OTHER PUBLICATIONS

Tran, Duc A.; Nguyen, Thinh. Localization in Wireless Sensor Networks Based on Support Vector Machines. IEEE Transactions on Parallel and Distributed Systems, vol. 19, Issue: 7. https://ieeexplore.ieee.org/stamp/stamp.jsp?tp=&arnumber=4384476 (Year: 2008).*

Li, Dawei et al. Edge Computing-based Defect Identification Model of Power IoT Edge Side Devices. 2020 IEEE International Conference on Information Technology, Big Data and Artificial Intelligence (ICIBA). https://ieeexplore.ieee.org/stamp/stamp.jsp?tp=&arnumber=9276498 (Year: 2020).*

Extended European Search Report in corresponding European application No. 24223205.6 mailed May 15, 2025, in 10 pages.

\* cited by examiner

DISTRIBUTED COMPUTING TO IMPLEMENT PRIVACY POLICIES ON EDGE DEVICES

BACKGROUND

Field

This disclosure is generally directed to processing image and/or video data, and more particularly, to a distributed architecture configured to process image and/or video data.

SUMMARY

Provided herein are system, apparatus, article of manufacture, method and/or computer program product embodiments, and/or combinations and sub-combinations thereof, for distributing processing of sensor data.

In some aspects, a method is provided for distributing processing of sensor data. The method may include determining processing capabilities of each of one or more edge devices of a network. Additionally, the method may include determining available processing resources of each of the one or more edge devices. Moreover, the method may include selecting, from the one or more edge devices, a target device, based on the processing capabilities of each of the one or more edge devices and the available processing resources of each of the one or more edge devices. Further, the method may include communicating with the target device to cause the target device to generate one or more feature vectors based on sensor data generated by the target device.

In other aspects, a computing system is provided for distributing processing of sensor data. The computing system may include a memory that stores instructions and at least one processor coupled to the memory. The at least one processor may be configured to execute the instructions to determine processing capabilities of each of one or more edge devices of a network. Additionally, the at least one processor may be configured to execute the instructions to determine available processing resources of each of the one or more edge devices. Moreover, the at least one processor may be configured to execute the instructions to select, from the one or more edge devices, a target device, based on the processing capabilities of each of the one or more edge devices and the available processing resources of each of the one or more edge devices. Further, the at least one processor may be configured to communicate with the target device to cause the target device to generate one or more feature vectors based on sensor data generated by the target device.

In various aspects, a non-transitory computer-readable medium is provided for distributing processing of sensor data. The non-transitory computer-readable medium may store instructions that, when executed by at least one processor, cause the at least one processor to perform operations comprising determining processing capabilities of each of one or more edge devices of a network. Additionally, the operations may include determining available processing resources of each of the one or more edge devices. Moreover, the operations may include selecting, from the one or more edge devices, a target device, based on the processing capabilities of each of the one or more edge devices and the available processing resources of each of the one or more edge devices. Further, the operations may include communicating with the target device to cause the target device to generate one or more feature vectors based on sensor data generated by the target device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Security systems, such as home security systems, may include sensor based devices (e.g., cameras, microphones, motion sensors etc.) that generate and collect an extensive amount of sensor data, such as video footage, still images, and/or audio data. These security systems may require an extensive amount of computing resources to process collected sensor data to, for example, make sophisticated inferences or determinations about what is occurring at the install site. In some instances, the sensor data may include private or otherwise sensitive information that a user may not want uploaded or communicated to outside systems or entities.

Aspects of the disclosed technology provide solutions for distributing processing of the sensor data. In some approaches, processing may be distributed between two or more edge devices of the security system, for example, so that security system can make local determinations about events in the associated environment, without transmitting the sensor data to remote network devices (e.g., remote management systems or other third-party devices). In other aspects, processing may be distributed between one or more local/edge devices of the security system, and one or more remote systems (e.g., management systems or servers) that are configured to support security system operations. In such approaches, portions of data processing may be performed locally, and the partially processed data may then be transmitted to one or more remote (cloud) systems, e.g., to make more sophisticated determinations about the occurrence of events at the install site. For example, the security system may be configured to process the sensor data to generate one or more feature vectors representative of objects and/or events/behaviors detected at the install site, and to provide the feature vectors to one or more remote systems. By transmitting partially processed sensor data, as opposed to transmitting raw sensor data (such as images, audio and/or video) or completed inferences, user privacy may be preserved because feature vectors may obfuscate the objects/events they represent and would therefore have little meaning to intervening third-party entities/devices.

In some aspects, users of the security system may define specific privacy filters or policies to limit the types of information transmitted or otherwise provided to devices/entities offsite. For example, privacy filters may be defined based on objects (including people, animals, and inanimate objects) for which outside data transmission should be blocked. Privacy filters may also be defined using natural language descriptions of the type of object, or event to be filtered. As discussed in further detail below, user rights for controlling distributed processing, and/or for controlling privacy filter granularity may be dependent on permissions granted to the user, e.g., as part of a subscription access license agreement.

Figure 1:
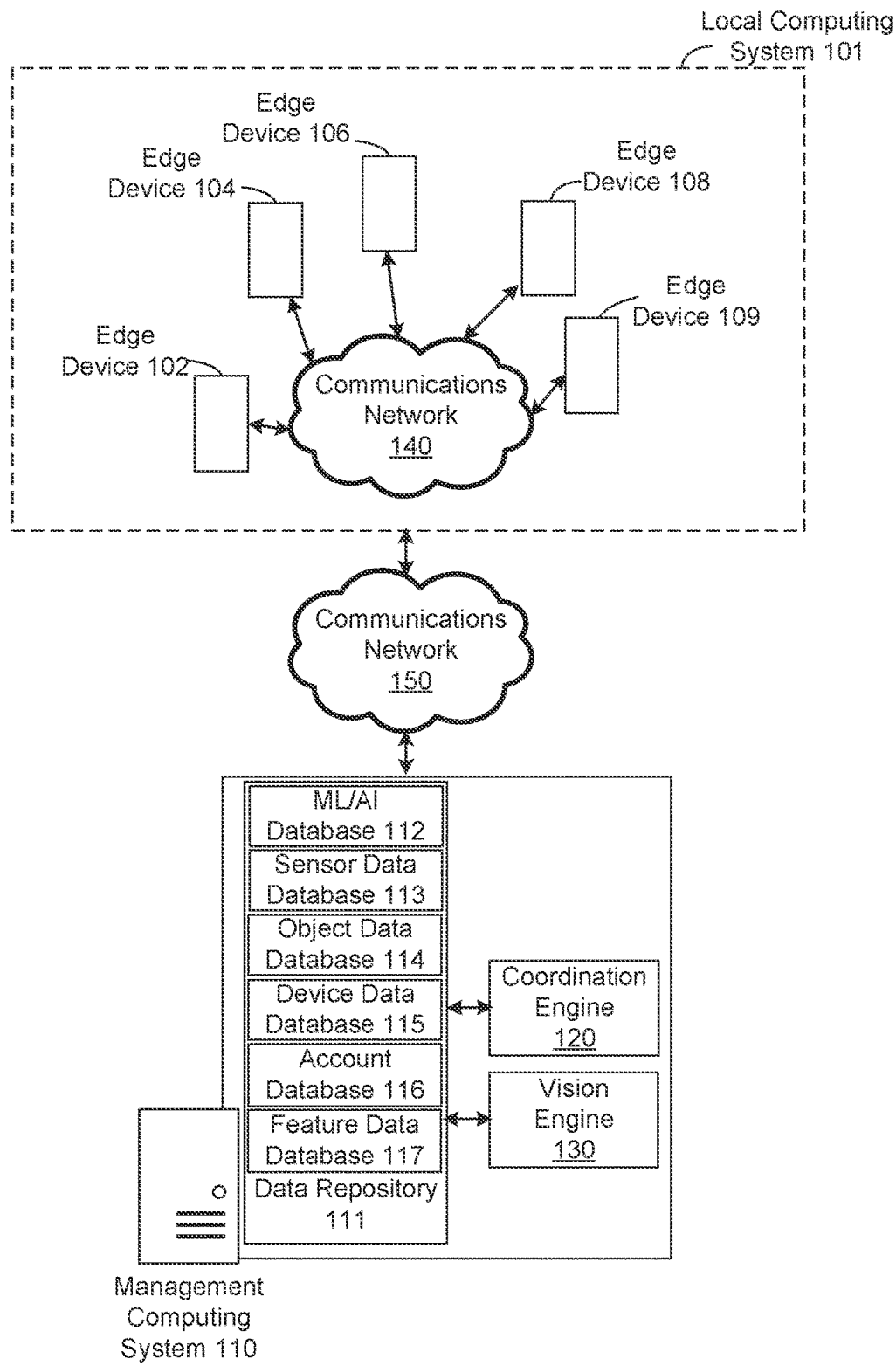
FIG. 1 illustrates a diagram of an example computing environment that includes a security system, according to some examples of the present disclosure.

FIG. 1 is a diagram illustrating an example computing environment 100, consistent with certain disclosed embodiments. As illustrated in FIG. 1, computing environment 100 may include computing systems, such as local computing system 101 including one or more edge devices (e.g., edge device 102, edge device 104, edge device 106, edge device 108 and edge device 109), and management computing system 110. Examples of the edge devices may include, but are not limited to, a sensor based device (e.g., a device including one or more sensors, such as an optical sensor and/or microphone), a camera, a multimedia device, such a television, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, and/or execute software instructions to perform one or more of the exemplary processes described herein.

Additionally, the one or more computing systems may be interconnected through any appropriate combination of communications networks, such as communications network 140 and communications network 150. Examples of communications networks, such as communications include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the one or more edge devices and the one or more computing systems operating within computing environment 100 may perform operations that establish and maintain one or more secure channels of communication across the communications networks, such as, but not limited to, a transport layer security (TSL) channel, a secure socket layer (SSL) channel, or any other suitable secure communication channel.

In some instances, and as illustrated in FIG. 1, the edge devices of local computing system 101 may communicate with one another using a local communications network, such as communications network 140, and the management computing system 110 may communicate with local computing system 101 including the one or more edge devices via a second communications network, such as communications network 140.

As described herein, the edge devices of local computing system 101 may include one or more sensors (e.g., optical sensors, microphones, etc.) and may generate sensor data associated with an environment and objects therein. 1. For instance, edge device 102, edge device 106, and edge device 108, may each include an optical sensor that may generate sensor data that includes one or more images or a video of the surrounding environment that are within a field of view of the optical sensor.

Additionally, each of the edge devices of local computing system 101 (e.g., edge device 102, edge device 104, edge device 106, edge device 108 and edge device 109) may communicate with one another to collect and process sensor data generated by edge devices of local computing system 101 that includes on or more sensors (herein described as "sensor-based edge devices"). Edge devices can be configured to collect and process sensor data and/or to receive and process sensor data provided by one or more other edge device. In some examples, sensor data processing may include the application of one or more trained artificial intelligence or machine learning (AI/ML) processes, for example, to perform object or behavior detection. In such examples, the AI/ML processes may include generating feature vectors of one or more objects in an environment the edge device is in. In some instances, the edge devices may obtain an AI/ML dataset that includes one or more parameters of a trained AI/ML process from management computing system 110.

As described herein, management computing system 110 may perform any of the example processes described herein to process sensor data generated by the edge devices of local computing system 101. By way of example, the edge devices of local computing system 101 may transmit sensor data to management computing system 110. One or more processors of management computing system 110 may execute vision engine 130 and executed vision engine 130 may obtain an artificial intelligence or machine learning (AI/ML) dataset from one or more tangible, non-transitory memories of management computing system 110, such as ML/AI database 112 of data repository 111. As described herein, the AI/ML dataset may include one or more parameters of a trained AI/ML process associated with object detection within one or more images or one or more frames of a video included in the sensor data. Additionally, executed vision engine 130 may apply the trained AI/ML process to sensor data generated by the edge devices, such as one or more images or frames of video footage included in the sensor data, based on the AI/ML dataset. Based on the application of the trained AI/ML process to the sensor data, executed vision engine 130 may at least generate one or more feature vectors associated with one or more objects included in the sensor data (e.g., one or more objects included in the one or more images or frames of the video footage). Moreover, based on the feature vectors, executed vision engine 130 may generate object data identifying the one or more objects detected in the one or more images or frames of the video footage. In some instances, executed vision engine 130 may perform operations that store, within one or more tangible non-transitory memories of management computing system 110, such as sensor data database 113 and object data database 114 of data repository 111, the sensor data and the object data, respectively.

Figure 2:
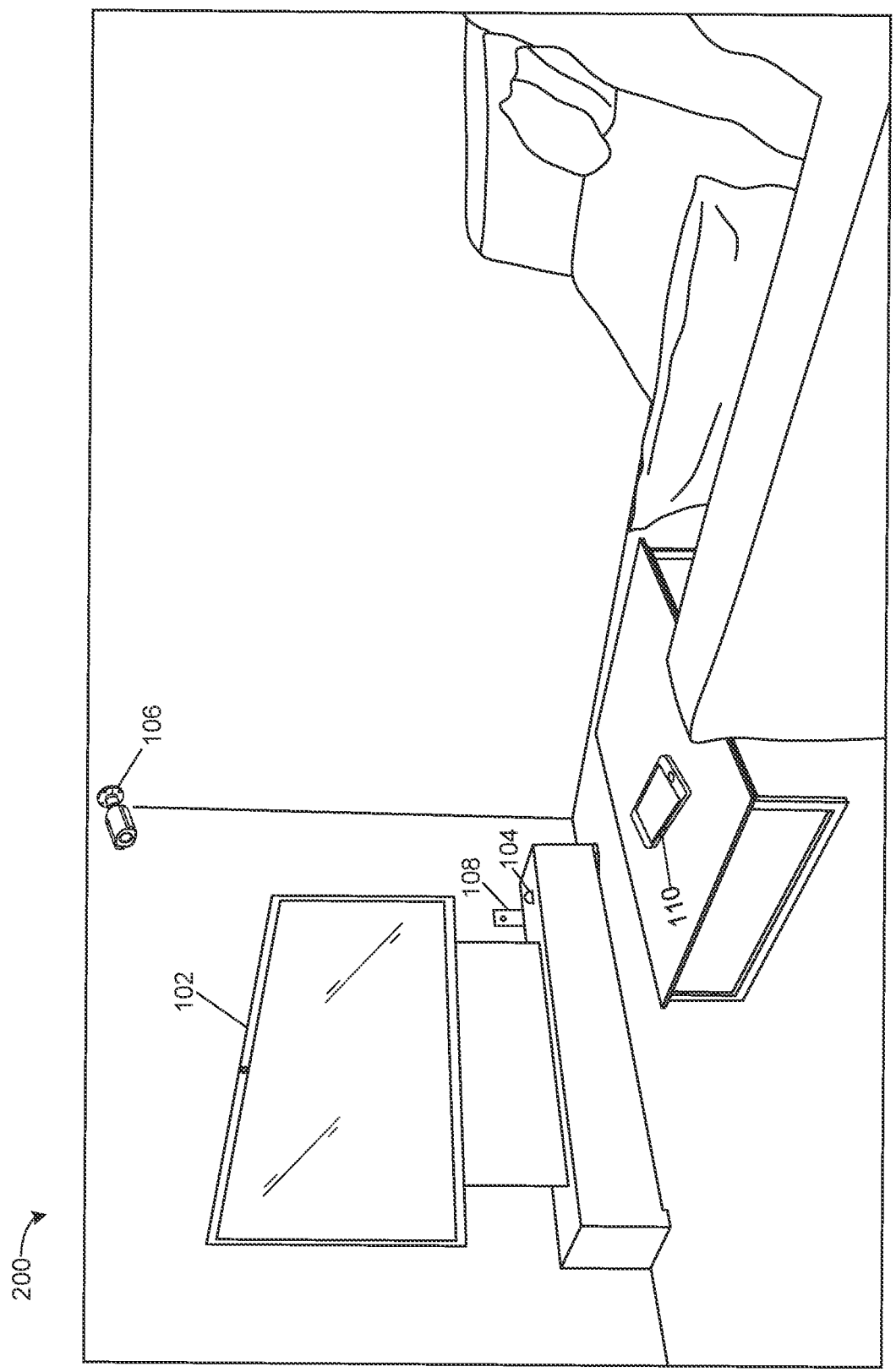
FIG. 2 illustrates a block diagram of a security system environment including one or more edge devices, according to some examples of the present disclosure.

However, as described herein, the volume of sensor data generated by the edge devices may be large, and the amount of computing resources required by management computing system 110 to process the sensor data may be extensive. As such, management computing system 110 may perform any of the example processes described herein to coordinate and distribute the processing of the sensor data of the edge devices over the edge devices. In some examples, management computing system 110 may coordinate and distribute the processing of the sensor data over the edge devices via a management device. As described herein, the management device may be an edge device of local computing system 101. For example, and referring to FIG. 2, environment 200 may represent a room in a home. Additionally, environment 200 may include edge device 102, edge device 104, edge device 106, edge device 108 and edge device 109 of local computing system 101. Moreover, edge device 102 and edge device 108 may each be a sensor based device that may be part of a local security system that management computing system 110 may maintain and provide support for (e.g., making inferences or determinations about what is occurring in environment 200). Further, edge device 104 may be the management device that coordinates the distribution of processing of sensor data generated by edge device 102 and/or edge device 108 over edge device 102, edge device 104, edge device 106, edge device 108 and/or edge device 109. Although environment 200 may represent a room in a home, environment 200 may also represent any location that a sensor based device may be installed or located at, such as a commercial location.

In some examples, the edge devices (e.g., edge device 102, edge device 104, edge device 106, edge device 108 and/or edge device 109) may select one of the edge devices to be the management device (e.g., edge device 104). In such examples, the edge devices may select one of the edge devices to be the management device based on whether the processing capabilities and available computing resources of each of the edge devices is best suited to perform the example processes and operations of a management device, as described herein. For example, the edge devices may select one of the edge devices to be the management device based on the processing capabilities and available computing resources of each of the edge devices. Additionally, the edge devices may select one of the edge devices to be the management device based on a predetermined set of processing parameters (e.g., a set of values) associated with the minimum processing capability for a management device, and a set of resource parameters (e.g. a set of values) associated with the minimum computing resources for the management device.

In some instances, the edge devices (e.g., edge device 102, edge device 104, edge device 106, edge device 108 and/or edge device 109) may identify multiple edge devices (e.g., edge device 102, and edge device 104) that may be selected to be the management device. In such instances, the edge devices may randomly select one of the identified edge devices to be the management device. In other instances, an edge device, such as edge device 104, may be selected to be the management devices. Additionally, the edge device may subsequently be unavailable (e.g., falls off the network, is powered down or stops working). In such instances, the edge devices may then perform the example processes described herein to select another edge device to be the management device.

Referring back to FIG. 1, a processor of management computing system 110 may execute coordination engine 120. Executed coordination engine 120 may perform any of the example processes described herein to coordinate and distribute the processing of the sensor data of the edge devices of local computing system 101. In some examples, executed coordination engine 120 may utilize the edge devices of local computing system 101 to process the sensor data. In such examples, executed coordination engine 120 may, via the management device, determine the processing capabilities of each of the edge devices of local computing system 101 (e.g., edge device 102, edge device 106, edge device 108, and edge device 109). Based on the first request, each of the edge devices that received the first request may provide information about the processing capabilities of the corresponding edge device. Executed coordination engine 120, via the management device, may determine the processing capabilities of each of the edge devices based on the information about the processing capabilities of the corresponding edge device.

By way of example, executed coordination engine 120 may instruct edge device 104, the management device, to transmit a first request to edge device 102, edge device 106, edge device 108 and edge device 109. Additionally, edge device 104 may transmit a first request, to edge device 102, edge device 106, edge device 108, and edge device 109. The first request may be for information about the processing capabilities of the corresponding edge device. Based on the first request, edge device 102, edge device 106, edge device 108, and edge device 109 may generate a message that includes information about the processing capabilities of the corresponding edge device. In some instances, the message may include an identifier of the corresponding edge device. Moreover, each of edge device 102, edge device 104, edge device 106, edge device 108, and edge device 109 may transmit the message to management computing system 110 (or the management device). Edge device 104 may parse the message of each of edge device 102, edge device 106, edge device 108, and edge device 109 and determine the processing capabilities of each of edge device 102, edge device 106, edge device 108, and edge device 109. In some instances, edge device 104 may also determine its own processing capabilities. In other instances, edge device 104 may perform operations that store, within one or more tangible non-transitory memories of edge device 104, the information of the processing capabilities of each of edge device 102, edge device 106, edge device 108, and edge device 109 and corresponding identifier of the corresponding edge device.

In various instances, each edge device that receives the first request may directly transmit the message including information about the processing capabilities of the corresponding edge device to executed coordination engine 120. In such instances, executed coordination engine 120 may parse the message of each of edge device 102, edge device 106, edge device 108, and edge device 109 and determine the processing capabilities of each of edge device 102, edge device 106, edge device 108, and edge device 109. Additionally, executed coordination engine 120 may perform operations that store, within one or more tangible non-transitory memories of management computing system 110, such as device data database 115 of data repository 111, the information of the processing capabilities of each of edge device 102, edge device 106, edge device 108, and edge device 109 and corresponding identifier of the corresponding edge device. In some instances, edge device 104 may provide information about the processing capabilities of edge device 104 to executed coordination engine 120. In such instances, executed coordination engine 120 may perform operations that determine the processing capabilities of edge device 104 and store, within device data database 115 the information of the processing capabilities of edge device 104 and corresponding identifier of edge device 104.

Additionally, executed coordination engine 120, via the management device may determine the available processing resources of each of the edge devices of local computing system 101. In some examples, executed coordination engine 120, via the management device may transmit a second request, to each of the edge devices of local computing system 101 (e.g., edge device 102, edge device 106, edge device 108, and edge device 109), to obtain information about the available processing resources of each of the edge devices. Based on the second request, each of the devices that received the second request may provide information about the available processing resources of the corresponding edge device. Executed coordination engine 120, via the management device, may determine the available processing resources of each of the edge devices based on the information about the available processing resources of the corresponding edge device. In some instances, executed coordination engine 120 may, via the management device (e.g., edge device 104), may determine the available processing resources of the management device.

By way of example, and following the example above, executed coordination engine 120 may instruct edge device 104 (e.g., the management device) to transmit a second request to edge device 102, edge device 106, edge device 108 and edge device 109. Additionally, edge device 104 may transmit the second request, to edge device 102, edge device 106, edge device 108, and edge device 109. The second request may be for information about the available processing resources of the corresponding edge device. Based on the second request, edge device 102, edge device 106, edge device 108, and edge device 109 may generate a second message that includes information about the processing capabilities of the corresponding edge device. In some instances, the second message may include an identifier of the corresponding edge device. Moreover, each of edge device 102, edge device 106, edge device 108, and edge device 109 may transmit the second message to edge device 104. Edge device 104 may parse the second message of each of edge device 102, edge device 106, edge device 108, and edge device 109 and determine the available processing resources of each of edge device 102, edge device 106, edge device 108, and edge device 109. In some instances, edge device 104 may also determine its own available processing resources. In other instances, edge device 104 may perform operations that store, within one or more tangible non-transitory memories of edge device 104, the information of the available processing resources of each of edge device 102, edge device 106, edge device 108, and edge device 109 and corresponding identifier of the corresponding edge device.

In various instances, each of the edge devices that received the second request may directly transmit the message including information about the available processing resources of the corresponding edge device to executed coordination engine 120. In such instances, executed coordination engine 120 may parse the message of each of edge device 102, edge device 106, edge device 108, and edge device 109 and determine the available processing resources of each of edge device 102, edge device 106, edge device 108, and edge device 109. Additionally, executed coordination engine 120 may perform operations that store, within one or more tangible non-transitory memories of management computing system 110, such as device data database 115 of data repository 111, the information of the available processing resources of each of edge device 102, edge device 106, edge device 108, and edge device 109 and corresponding identifier of the corresponding edge device. In some instances, edge device 104 may provide information about the available processing resources of edge device 104 to executed coordination engine 120. In such instances, executed coordination engine 120 may perform operations that determine the available processing resources of edge device 104 and store, within device data database 115 the information of the available processing resources of edge device 104 and corresponding identifier of edge device 104.

In some instances, the first request and second request may be combined. In such instances, executed coordination engine 120, via the management device, may transmit a request to each of the edge devices of computing environment 100. The request may be for information about the processing capabilities of the corresponding edge device and information about the available resources of the corresponding edge device. Further, each of the edge devices that receives the request may provide information about the processing capabilities of the corresponding edge device along with information about the available resources of the corresponding edge device, based on the request.

Further, executed coordination engine 120, via the management device, may determine or select one or more target devices from the edge devices of local computing system 101. As described herein, the one or more target devices may be one of the edge devices, and in some instances, including the management device, that fully or partially process sensor data of the corresponding edge device and/or one or more other edge devices of local computing system 101. Additionally, executed coordination engine 120, via the management device, may determine or select the one or more target devices based on the information associated with processing capabilities and/or available processing resources of the corresponding target device. Moreover, executed coordination engine 120, via the management device, may transmit processing instructions to each of the one or more target devices, and the processing instructions may cause each of the one or more target devices to process the sensor data. In some instances, the processing instructions may include the AI/ML dataset as described herein. Further, one or more processors of each of the one or more target devices may process sensor data (e.g., sensor data of the target device and/or sensor data of one or more other edge devices) by applying one or more trained artificial intelligence or machine learning (AI/ML) processes to the sensor data. In some instances, the one or more trained AI/ML processes may be associated with object detection. In such instances, the one or more processors of each target device may generate feature vectors of one or more objects in an environment the corresponding target device is in based on the application of the one or more trained AI/ML processes to the sensor data.

By way of example, edge device 104, the management device, may obtain, from one or more tangible non-transitory memories of edge device 104, information associated with the processing capabilities of the corresponding edge device. Additionally, edge device 104 may obtain, from one or more tangible non-transitory memories of edge device 104, information associated with the available resources of the corresponding edge device. The one or more processors of edge device 104 may determine, for each edge device of local computing system 101, whether the edge device has the processing capabilities to process sensor data generated by the edge device and/or one or more other edge devices of local computing system 101, based on the information associated with the processing capabilities of each edge device. Based on the information associated with the available processing resources of each edge device, edge device 104 may determine, for each edge device of local computing system 101, whether the edge device has the available processing resources to process the sensor data generated by the edge device and/or one or more other edge devices of local computing system 101. Based on whether the one or more target devices has the processing capabilities to process the sensor data and whether the one or more target devices has the available processing resources to process the sensor data, edge device 104 may determine or select one or more target devices from the edge devices of local computing system 101. For instance, and referring to FIG. 2, edge device 104 (e.g., the management device) may select edge device 102 as a target device. Edge device 104 may determine edge device 102 has the processing capabilities to process the sensor data and has the available processing resources to process the sensor data generated by the sensor-based devices, such as edge device 106 and edge device 108 of local computing system 101. Further, the one or more processors of edge device 104 transmit processing instructions to each of the one or more target devices, and the processing instructions may cause each of the one or more target devices to process the sensor data.

In some examples, a target device may not have available resources to process the sensor data. In such examples, executed coordination engine 120 or the management device may instruct the target device to delay processing of the sensor data until the processing resources become available. By way of example, and referring to FIG. 2, edge device 104, the management device, may obtain information, from edge device 106, characterizing the processing capabilities and the available processing resources of edge device 106 at a first time. Additionally, one or more processors of edge device 104 may make a first determination that edge device 106 has the processing capabilities to process the sensor data generated by edge device 106 and/or one or more other edge devices, such as edge device 102 and edge device 108 based on information characterizing the processing capabilities of edge device 106. In such an example, edge device 102, edge device 106 and edge device 108 may each include at least one optical sensor that generates sensor data including one or more images or video. Moreover, the one or more processors of edge device 104 may make a second determination that edge device 106 may not have enough processing resources to process the sensor data at the first time. As such, and based on the first determination and second determination, the one or more processors of edge device 104 may determine edge device 106 may be a target device and may cause edge device 106 to delay processing of the sensor data generated. Further, executed coordination engine 120 (or the management device) may continuously or periodically obtain information characterizing the available processing resources of edge device 106. Based on the information characterizing the available processing resources of edge device 106, the one or more processors of edge device 104 may monitor and determine when edge device 106 may have enough processing resources to process the sensor data. Based on the one or more processors of edge device 104 determining edge device 106 has enough processing resources to process the sensor data, the one or more processors of edge device 104 may generate and transmit processing instructions to edge device 106 over one or more communications networks, such as communications network 150. The processing instructions may cause edge device 106 to process the sensor data generated by edge device 106 and/or one or more other edge devices.

As described herein, executed coordination engine 120 or the management device may select, identify or determine or assign, for each of the one or more target devices of local computing system 101, a portion of the total volume of sensor data generated by edge devices of local computing system 101. In some examples, executed coordination engine 120 or the management device may transmit processing instructs each of multiple target devices. Additionally, the processing instructions of each of the multiple target devices may indicate a portion of the total volume of sensor data a corresponding edge device is to process. By way of example, edge device 104, the management device, (or executed coordination engine 120) may obtain from each of the multiple sensor-based edge devices of local computing system 101 (e.g., edge device 106 and edge device 108 of FIG. 2), information characterizing the size or volume of the sensor data generated by the corresponding edge device. Additionally, one or more processors of edge device 104 may determine the total volume or size of sensor data the multiple edge devices have generated based on the information characterizing the size or volume of the sensor data generated by each edge device of computing environment 100. Moreover, for each of the multiple target devices, one or more corresponding processors may determine a portion of the total sensor data to assign to the corresponding target device. The determined portion may be based on the processing capabilities and/or available processing resources of the corresponding target device. In some instances, for each assigned portion, one or more processors of edge device 104 may determine or identify an edge device that generated such part of the assigned portion. In such instances, the one or more processors of edge device 104 may generate transmittal instructions to each edge device that generated a corresponding part of the assigned portion. The transmittal instructions may cause the corresponding edge device to transmit the corresponding part of the sensor data generated by the corresponding edge device to the assigned target device. Further, the one or more processors of edge device 104 may transmit processing instructions to each of the multiple target devices. The processing instructions may cause each of the multiple target devices to process the assigned portion of sensor data, as described herein. In some instances where a target device generates sensor data, such information about the generated sensor data may be taken into account when determining a portion of the total sensor data to assign to such target device.

As described herein, privacy considerations may be taken into account to the coordination and distribution of the processing of sensor data by one or more target devices of local computing system 101. In some examples, management computing system 110 and/or the management device may obtain privacy indicator information. In some examples, the privacy indicator information may indicate one of multiple privacy levels and each of the multiple privacy levels may indicate how the sensor data generated by the edge devices of local computing system 101 should be processed or treated.

In some instances, a first privacy level of the multiple privacy levels, may indicate none of the sensor data should be transmitted outside of a communications network of the edge devices of local computing system 101 (e.g., communications network 140), such as to another computing device or computing system, such as management computing system 110, that is on another communications network (e.g., communications network 150). By way of example, for the first privacy level, edge device 104, the management device, may instruct one or more target devices of local computing system 101 to process the sensor data generated by one or more of edge devices (e.g., edge device 106 and edge device 108 of FIG. 2). As described herein, the processing of sensor data may generate one or more feature vectors. Additionally, in examples where the sensor data includes one or more images or video footage, the one or more feature vectors may be associated with one or more objects in the one or more images or video footage. Further, management computing system 110, such as executed vision engine 130, via edge device 104 may obtain the one or more feature vectors from the one or more target devices.

In other instances, a second privacy level of the multiple privacy levels, may indicate the sensor data may be transmitted or provided to a computing device or computing system of a communications network different than the communications network of the edge devices of local computing system 101. For instance, the second privacy level may indicate that sensor data of the one or more edge devices (e.g., .g., edge device 106 and edge device 108 of FIG. 2) of local computing system 101 may be transmitted to management computing system 110. Additionally, the second privacy level may indicate the computing device or computing system of a communications network different than the communications network of the edge devices may process the sensor data. For instance, management computing system 110 may have permission to process the sensor data for object detection purposes. By way of example, for the second privacy level, edge device 104, the management device, may transmit transmittal instructions to one or more of the edge devices of local computing system 101 (e.g., edge device 106, and edge device 108 of FIG. 2). The transmittal instructions may cause each of the one or more of the edge devices to transmit sensor data to management computing system 110, and in some instances via the management device, edge device 104. Further, management computing system 110, such as executed vision engine 130, may obtain the sensor data and process the sensor data as described herein.

In various instances, a third privacy level of the multiple privacy levels may indicate one or more portions of the sensor data generated by each of the one or more edge devices of local computing system 101 may be sent to other edge devices of another communications network for processing. For instance, the third privacy level may indicate that an edge device other than the edge device that originally generated the sensor data may process the sensor data. By way of example, edge device 102, edge device 106 and edge device 108 may each generate sensor data. Additionally, for the third privacy level, edge device 104, the management device, may transmit transmittal instructions to edge device 102, edge device 106 and edge device 108 to transmit sensor data to a target device, such as edge device 110. Further, the management device may instruct the target device to process the sensor data.

In some examples, the privacy indicator information may be based on device data of an edge device. In such examples, the edge device may include one or more sensors (e.g., an optical sensor) and the device data of the edge device may indicate whether the edge device is associated with a private or public location. In some instances, the device data may include location information, such as GPS coordinates, associated with the location of the edge device. In other instances, the device data may include a label indicating the corresponding edge device is in a private or public location. Additionally, executed coordination engine 120 and/or a management device may obtain the device data of the edge device from device database 115. Moreover, executed coordination engine 120 and/or a management device may determine whether the edge device is associated with a private or public location. For instance, based on the location information included in the device data of the edge device or a label indicating whether the edge device is located in a private or public location, executed coordination engine 120 and/or a management device may determine whether the edge device is located in a private or public location. Further, executed coordination engine 120 and/or a management device may determine a privacy level associated with the determination of whether the edge device is associated with a private or public location. Executed coordination engine 120 and/or a management device May perform operations to process the sensor data of the edge device in accordance with the determined privacy level.

By way of example, edge device 106 may be a camera in a private location and device data of edge device 106 may indicate edge device 106 is in a private location. For instance, location information included in the device data or a label included in the device data may indicate edge device 106 is in a private location. Additionally, edge device 104, the management device, may obtain the device data of edge device 106 from management computing system 110. In some instances, edge device 104 may receive an identifier of edge device 106 (e.g., the internet protocol (IP) address, Media Access Control (MAC) address, etc.) and request from management computing system 110 device data stored in device database 115 that is associated with the identifier of edge device 106. Moreover, one or more processors of edge device 104 may determine edge device 106 is associated with a private location based on the device data. Further, the one or more processors of edge device 104 may determine edge device 106 may be associated with a first privacy level as described herein based on the determination that edge device 106 is associated with a private location. Executed coordination engine 120 and/or edge device 104 may perform any of the example processes described herein to process the sensor data of edge device 106 in accordance with the determined privacy level. For instance, the one or more processors of edge device 104 may perform any of the example processes as described herein to determine or select one or more target devices, including edge device 106, to process the sensor data of edge device 106.

In another example, edge device 106 may include a camera and edge device 106 may be in a public location. Additionally, the device data of edge device 106 may indicate edge device 106 is in a public location. For instance, location information included in the device data or a label included in the device data may indicate edge device 106 is in a public location. Moreover, edge device 104, the management device, may obtain the device data of edge device 106 from management computing system 110. In some instances, edge device 104 may receive an identifier of edge device 106 (e.g., the internet protocol (IP) address, Media Access Control (MAC) address, etc.) and request, from management computing system 110, device data stored in device data database 115 that is associated with the identifier of edge device 106. Based on the device data, one or more processors of edge device 104 may determine edge device 106 is associated with a public location. Further, the one or more processors of edge device 104 may determine edge device 106 may be associated with a second privacy level as described herein based on the determination that edge device 106 is associated with a public location. Executed coordination engine 120 and/or edge device 104 may perform any of the example processes described herein to process the sensor data of edge device 106 in accordance with the determined privacy level. For instance, the one or more processors of edge device 104 may perform any of the example processes as described herein to cause edge device 106 to transmit or provide sensor data generated by edge device 106 to management computing system 110. In such an instance, executed vision engine 130 of management computing system 110 may process the sensor data, as described herein.

In other examples, the privacy indicator information may be based on account data of a user of management computing system 110. In such examples, the account data of the user may include a unique identifier of the user (e.g., a name, a login credential, a picture, etc.), an identifier of each edge device associated with the user (e.g., the internet protocol (IP) address, Media Access Control (MAC) address, etc.), and a privacy indicator for one or more edge devices associated with the user. Additionally, executed coordination engine 120 and/or a management device may obtain the account data of the user from account database 116. Moreover, executed coordination engine 120 and/or a management device may determine a privacy level for the one or more edge devices of local computing system 101 (e.g., edge device 102, edge device 104, edge device 106, edge device 108, and/or edge device 109) based on the privacy indicator of the account data of the user. Further, executed coordination engine 120 and/or a management device may perform any of the example processes described herein to process the sensor data of the one or more edge devices of the user in accordance with the determined privacy level.

By way of example, account data of a user of management computing system 110 may indicate that a privacy indicator for edge device 102, edge device 104, edge device 106, edge device 108, and/or edge device 109 may be associated with a first privacy level as described herein. For instance, the user may be a celebrity and may desire that none of the sensor data generated by one or more edge devices of local computing system 101 is to be transmitted to management computing system 110 for processor for fear of private images included in the sensor data may be leaked onto the internet. As such, the account data of the user may indicate that the edge devices of local computing system 101 are associated with a first privacy level. Additionally, edge device 104, a management device, may obtain the account data of the user from account database 116. In some instances, edge device 104, the management device, may receive an identifier of the user (e.g., a picture of the user) and request, from management computing system 110, account data stored in account database 116 that is associated with the identifier of the user. Moreover, one or more processors of edge device 104 may determine edge device 102, edge device 104, edge device 106, edge device 108, and/or edge device 109 is associated with a first privacy level based on the account data. Further, executed the one or more processors of edge device 104 may perform any of the example processes described herein to process the sensor data of one or more of edge devices of local computing system 101 (e.g., edge device 106, and edge device 108) of FIG. 2) in accordance with the first privacy level. For instance, the one or more processors of edge device 104 may perform any of the example processes as described herein to determine one or more target devices from edge device 102, edge device 104, edge device 106, edge device 108, and edge device 109, to process the sensor data generated by the one or more edge devices of local computing system 101.

In another example, account data of a user of management computing system 110 may indicate that a privacy indicator for edge device 102, edge device 104, edge device 106, edge device 108, and/or edge device 109 may be associated with a second privacy level as described herein. Additionally, edge device 104, the management device, may obtain the account data of the user from account database 116. In some instances, edge device 104 may receive an identifier of the user and request, from management computing system 110, account data stored in account database 116 that is associated with the identifier of the user. Moreover, one or more processors of edge device 104 may determine edge device 102, edge device 104, edge device 106, edge device 108, and/or edge device 109 is associated with a second privacy level based on the account data. Further, the one or more processors of edge device 104 may perform any of the example processes described herein to process the sensor data of one or more of edge devices of local computing system 101 (e.g., edge device 106, and edge device 108 of FIG. 2) in accordance with the second privacy level. For instance, the one or more processors of edge device 104 may perform any of the example processes as described herein to cause the edge devices of local computing system 101 to transmit sensor data to management computing system 110. In such an instance, executed vision engine 130 of management computing system 110 may process the sensor data, as described herein.

In another example, account data of a user of management computing system 110 may indicate that a privacy indicator for edge device 102, edge device 104, edge device 106, edge device 108, and/or edge device 109 may be associated with a third privacy level as described herein. Additionally, edge device 104, the management device, may obtain the account data of the user from account database 116. In some instances, edge device 104 may receive an identifier of the user and request, from management computing system 110, account data stored in account database 116 that is associated with the identifier of the user. Moreover, one or more processors of edge device 104 may determine edge device 102, edge device 104, edge device 106, edge device 108, and/or edge device 109 is associated with the third privacy level based on the account data. Further, the one or more processors of edge device 104 may perform any of the example processes described herein to process the sensor data of one or more of edge devices of local computing system 101 (e.g., edge device 106, and edge device 108 of FIG. 2) in accordance with the third privacy level. For instance, the one or more processors of edge device 104 may perform any of the example processes as described herein to determine one or more target devices from edge device 102, edge device 104, edge device 106, edge device 108, and edge device 109, to process the sensor data generated by the one or more other edge devices of local computing system 101.

In various examples, management computing system 110 may receive one or more feature vectors from one or more target devices of communications network 140. In some instances, management computing system 110 may receive the one or more feature vectors via a management device, such as edge device 104. In such examples, management computing system 110, such as executed vision engine 130, may perform any of the example processes described herein to determine one or more inferences associated with the one or more feature vectors. For example, executed vision engine 130 may access feature data database 117 to identify one or more feature vectors of known objects that match or are similar to the feature vectors obtained from the one or more target devices. Further, based on the feature vectors of the known objects, executed vision engine 130 may determine one or more characteristics of objects associated with the feature vectors obtained from the one or more target devices. For instance, the one or more feature vectors from one or more target devices may be associated with a tiger. In such an instance, executed vision engine 130 may access feature data database 117 to identify one or more feature vectors of known objects that match or are similar to the feature vectors obtained from the one or more target devices. The one or more feature vectors of known objects may be associated with a tiger or other big cats. As such, based on the one or more feature vectors of the known objects, executed vision engine 130 may determine one or more characteristics of an object included in the sensor data that the one or more target devices processed.

Figure 3:
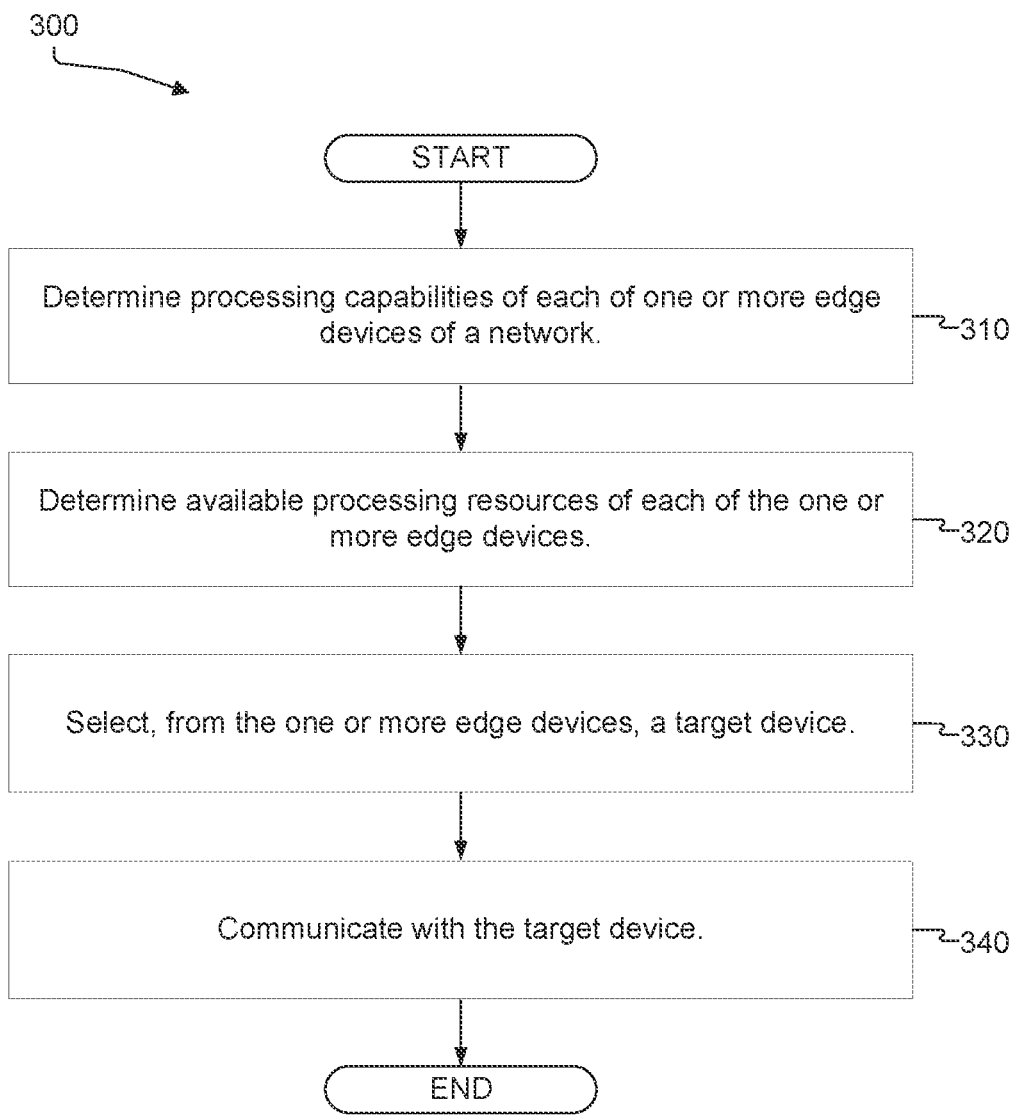
FIG. 3 illustrates a flow chart of an example process for processing sensor data generated by one or more edge devices within a local network, according to some examples of the present disclosure.

FIG. 3 is a flow chart for an example process 300 for causing one or more edge devices to generate feature vectors based on sensor data generated by the corresponding edge device. In some instances, one or more components of computing environment 100 may perform all or a portion of the steps of example process 300, which include but are not limited to determining processing capabilities of each of one or more edge devices of a network, determining available processing resources of each of the one or more edge devices, selecting, from the one or more edge devices, a target device, and communicating with the target device. Further, some of the steps may be performed simultaneously, or in a different order than shown in FIG. 3, as will be understood by a person of ordinary skill in the art Referring to FIG. 3, a management device, such as edge device 104, may determine processing capabilities of each of one or more edge devices of a network (e.g., step 310 of FIG. 3). For example, edge device 104 may transmit a first request, to edge device 102, edge device 106, edge device 108, and edge device 109 of local computing system 101. The first request may be for information about the processing capabilities of the corresponding edge device. Based on the first request, edge device 102, edge device 106, edge device 108, and edge device 109 may generate a message that includes information about the processing capabilities of the corresponding edge device. In some instances, the message may include an identifier of the corresponding edge device. Moreover, each of edge device 102, edge device 104, edge device 106, edge device 108, and edge device 109 may transmit the message to management computing system 110 (or the management device). Edge device 104 may parse the message of each of edge device 102, edge device 106, edge device 108, and edge device 109 and determine the processing capabilities of each of edge device 102, edge device 106, edge device 108, and edge device 109. In some instances, edge device 104 may also determine its own processing capabilities.

Additionally, a management device, such as edge device 104, may determine available processing resources of each of the one or more edge devices (e.g., step 320 of FIG. 3). For example, edge device 104 may transmit the second request, to edge device 102, edge device 106, edge device 108, and edge device 109. The second request may be for information about the available processing resources of the corresponding edge device. Based on the second request, edge device 102, edge device 106, edge device 108, and edge device 109 may generate a second message that includes information about the processing capabilities of the corresponding edge device. In some instances, the second message may include an identifier of the corresponding edge device. Moreover, each of edge device 102, edge device 106, edge device 108, and edge device 109 may transmit the second message to edge device 104. Edge device 104 may parse the second message of each of edge device 102, edge device 106, edge device 108, and edge device 109 and determine the available processing resources of each of edge device 102, edge device 106, edge device 108, and edge device 109. In some instances, edge device 104 may also determine its own available processing resources. In other instances, edge device 104 may perform operations that store, within one or more tangible non-transitory memories of edge device 104, the information of the available processing resources of each of edge device 102, edge device 106, edge device 108, and edge device 109 and corresponding identifier of the corresponding edge device.

Moreover, a management device, such as edge device 104, may select, from the one or more edge devices, a target device, and communicating with the target device (e.g., step 330 of FIG. 3). As described herein, the target device may be one of the edge devices, and in some instances, including the management device, that fully or partially process sensor data of one or more edge devices of local computing system 101 (e.g., edge device 106 and edge device 108 of FIG. 2). In some examples, edge device 104 may obtain information associated with the processing capabilities of each edge device. Additionally, edge device 104 may obtain information associated with the available resources of each edge device. The one or more processors of edge device 104 may determine, for each edge device of computing environment 100, whether the edge device has the processing capabilities to process sensor data generated by one or more edge devices of local computing system 101 (e.g., edge device 106 and edge device 108 of FIG. 2), based on the information associated with the processing capabilities of each edge device. Based on the information associated with the available processing resources of each edge device, edge device 104 may determine, for each edge device of computing environment 100, whether the edge device has the available processing resources to process sensor data generated by one or more edge devices of local computing system 101 (e.g., edge device 106 and edge device 108 of FIG. 2). Based on whether the one or more edge devices has the processing capabilities to process the sensor data and whether the one or more edge devices has the available processing resources to process the sensor data, edge device 104 may determine or select an edge device or target device from the one or more edge devices of computing environment 100 to process the sensor data. The sensor data may be generated by the target device and/or one or more other edge devices.

Further, a management device, such as edge device 104, may communicate with the target device (e.g., step 340 of FIG. 3). For example, one or more processors of edge device 104 transmit processing instructions to the target device. The processing instructions may cause the target device to process the sensor data. As described herein, the target device may process the sensor data and generate one or more feature vectors based on the sensor data.

Figure 4:
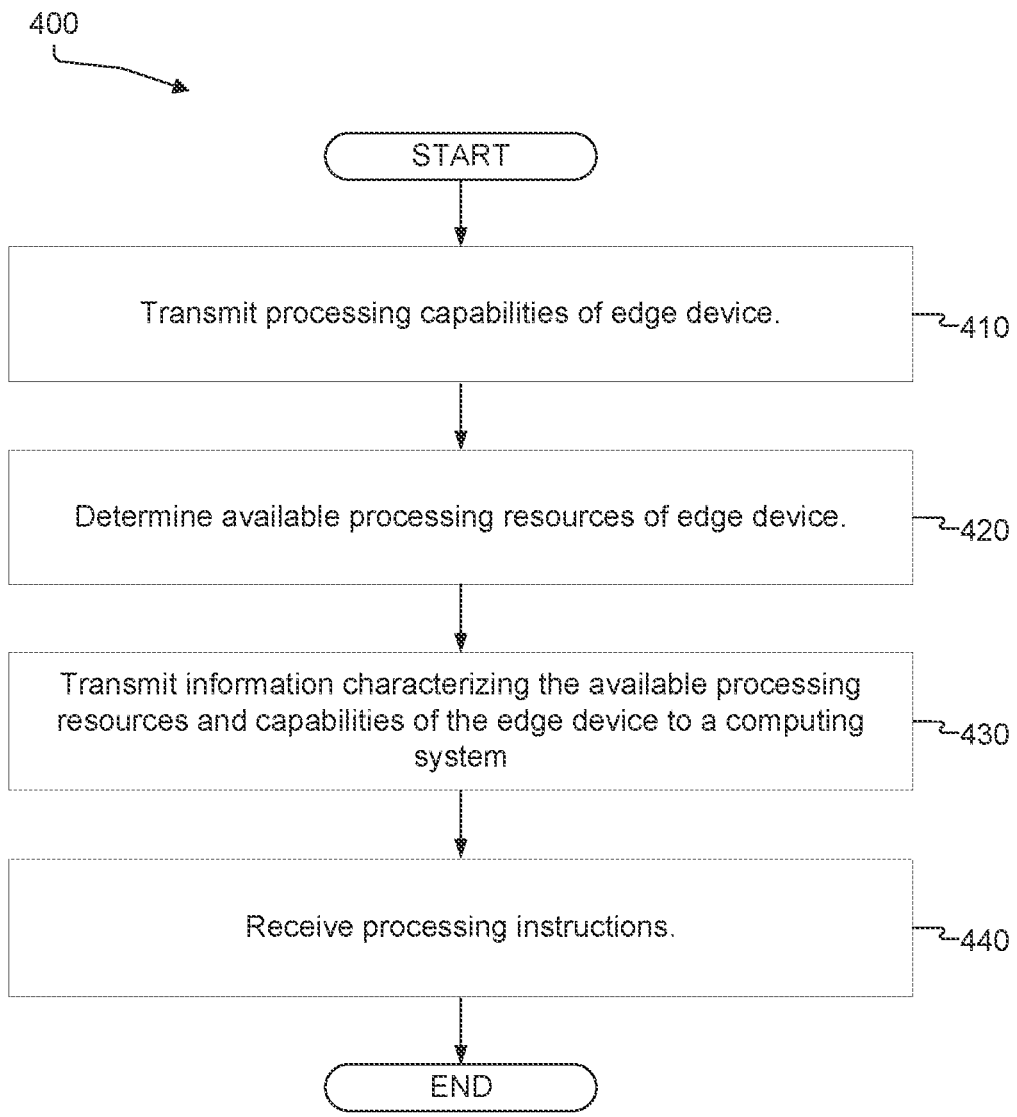
FIG. 4 illustrates a flow chart of another example process for processing sensor data generated by one or more edge devices within a local network, according to some examples of the present disclosure.

FIG. 4 is a flow chart for an example process 400 for one or more edge devices to generate feature vectors based on sensor data generated by the corresponding edge device. In some instances, one or more components of computing environment 100 may perform all or a portion of the steps of example process 400, which include but are not limited to transmitting processing capabilities of an edge device, determining available processing resources of the edge device, transmit available processing resource of the edge device, and receive processing instructions. Further, some of the steps may be performed simultaneously, or in a different order than shown in FIG. 4, as will be understood by a person of ordinary skill in the art Referring to FIG. 4, an edge device may determine processing capabilities of the edge device (e.g., step 410 of FIG. 4). For example, edge device 104 may transmit a first request, to edge device 102. The first request may be for information about the processing capabilities of the corresponding edge device. Based on the first request, one or more processors of edge device 102 may determine the processing capabilities of edge device 102.

Additionally, the edge device may determine available processing resources of the edge device (e.g., step 420 of FIG. 4). For example, edge device 104 may transmit the second request, to edge device 102. The second request may be for information about the available processing resources of the corresponding edge device. Based on the second request, one or more processors of edge device 102 may determine the processing capabilities of edge device 102.

Moreover, the edge device may transmit information characterizing the available resources and processing capabilities of the edge device to a computing system (e.g., step 430 of FIG. 4). For example, the one or more processors of edge device 102 may generate a message that includes information about the processing capabilities of edge device 102 and information about the available processing resources of edge device 102. Additionally, the one or more processors of edge device 102 may transmit the message to management computing system 110. In some instances, the one or more processors of edge device 102 may transmit the message to management computing system 110 via edge device 104. Management computing system 110, such as executed coordination engine 120, may perform any of the example processes described herein to determine whether edge device 102 may be a target device based on the received information about the processing capabilities of edge device 102 and information about the available processing resources of edge device 102. In some instances, edge device 104, the management device, may perform any of the example processes described herein to determine whether edge device 102 may be a target device based on the received information about the processing capabilities of edge device 102 and information about the available processing resources of edge device 102.

Further, the edge device may receive processing instructions from the computing system (e.g., step 430 of FIG. 4). For example, executed coordination engine 120 may determine edge device 102 is a target device based on the received information about the processing capabilities of edge device 102 and information about the available processing resources of edge device 102. Additionally, executed coordination engine 120 may transmit processing instructions to the edge device 102. The processing instructions may cause edge device 102 to process sensor data generated by one or more edge devices of local computing system 101 (e.g., edge device 106 and edge device 108 of FIG. 2). As described herein, the edge device 102 may process the sensor data and generate one or more feature vectors based on the sensor data.

Figure 5:
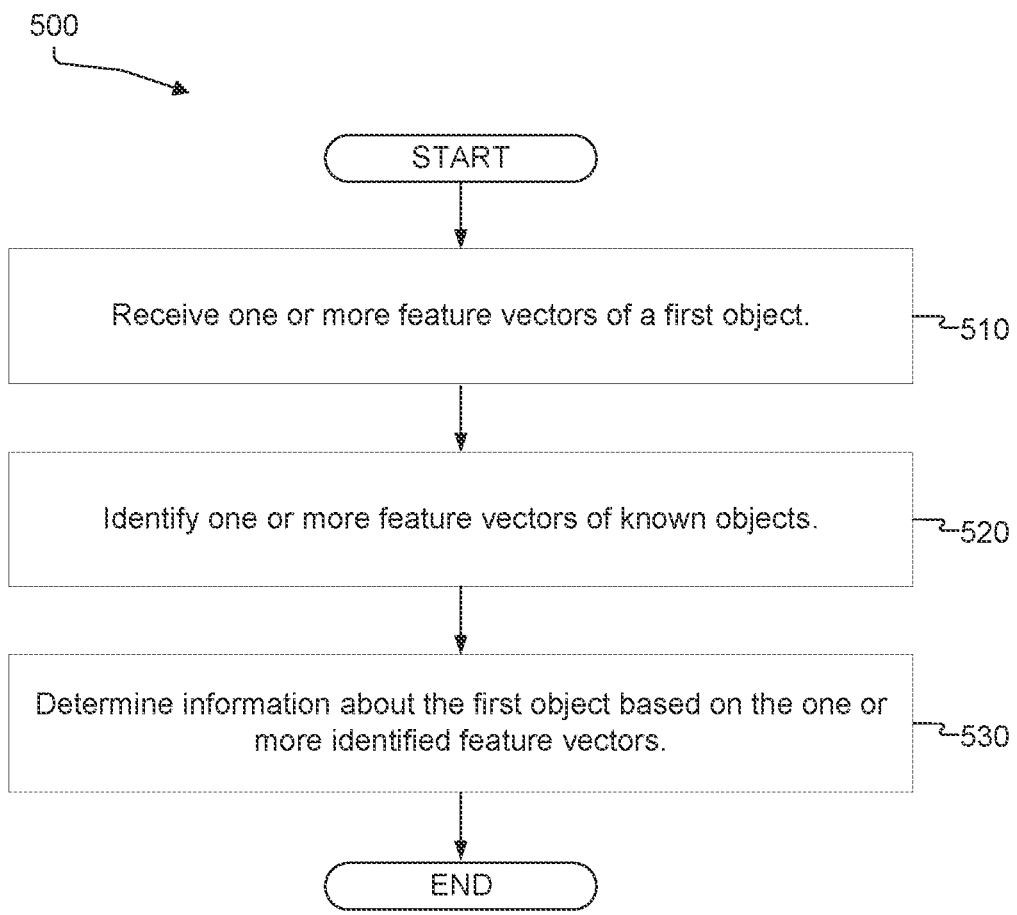
FIG. 5 illustrates a flow chart of an example process for processing one or more feature vectors generated by one or more target devices, according to some examples of the present disclosure.

FIG. 5 is a flow chart for an example process 500 for a computing system of a first network to perform one or more object detection operations based on one or more feature vectors received from one or more edge devices of a second network. In some instances, one or more components of computing environment 100 may perform all or a portion of the steps of example process 500, which include but are not limited to receiving one or more feature vectors of a first object, identifying one or more feature vectors of known objects, and determining information about the first object based on the one or more identified feature vectors. Further, some of the steps may be performed simultaneously, or in a different order than shown in FIG. 5, as will be understood by a person of ordinary skill in the art Referring to FIG. 5, management computing system 110 may receive one or more feature vectors of a first object (e.g., step 510 of FIG. 5). For example, executed vision engine 130 may receive one or more feature vectors from one or more target devices, such as edge device 102. The one or more feature vectors may be associated with associated with an object included in one or more images or video footage included in sensor data processed by the one or more target devices.

Additionally, management computing system 110 may identify one or more feature vectors of known objects (e.g., step 520 of FIG. 5). For example, executed vision engine 130 may access feature data database 117 to identify one or more feature vectors of known objects that match or are similar to the feature vectors obtained from the one or more target devices.

Moreover, management computing system 110 may determine information about the first object based on the one or more identified feature vectors (e.g., step 530 of FIG. 5). For example, based on the feature vectors of the known objects, executed vision engine 130 may determine one or more characteristics of objects associated with the feature vectors obtained from the one or more target devices. For instance, the one or more feature vectors from one or more target devices may be associated with a wolf. In such an instance, executed vision engine 130 may access feature data database 117 to identify one or more feature vectors of known objects that match or are similar to the feature vectors obtained from the one or more target devices. The one or more feature vectors of known objects may be associated with a canine or other big canines. As such, based on the one or more feature vectors of the known objects, executed vision engine 130 may determine one or more characteristics of an object included in the sensor data that the one or more target devices processed.

Figure 6:
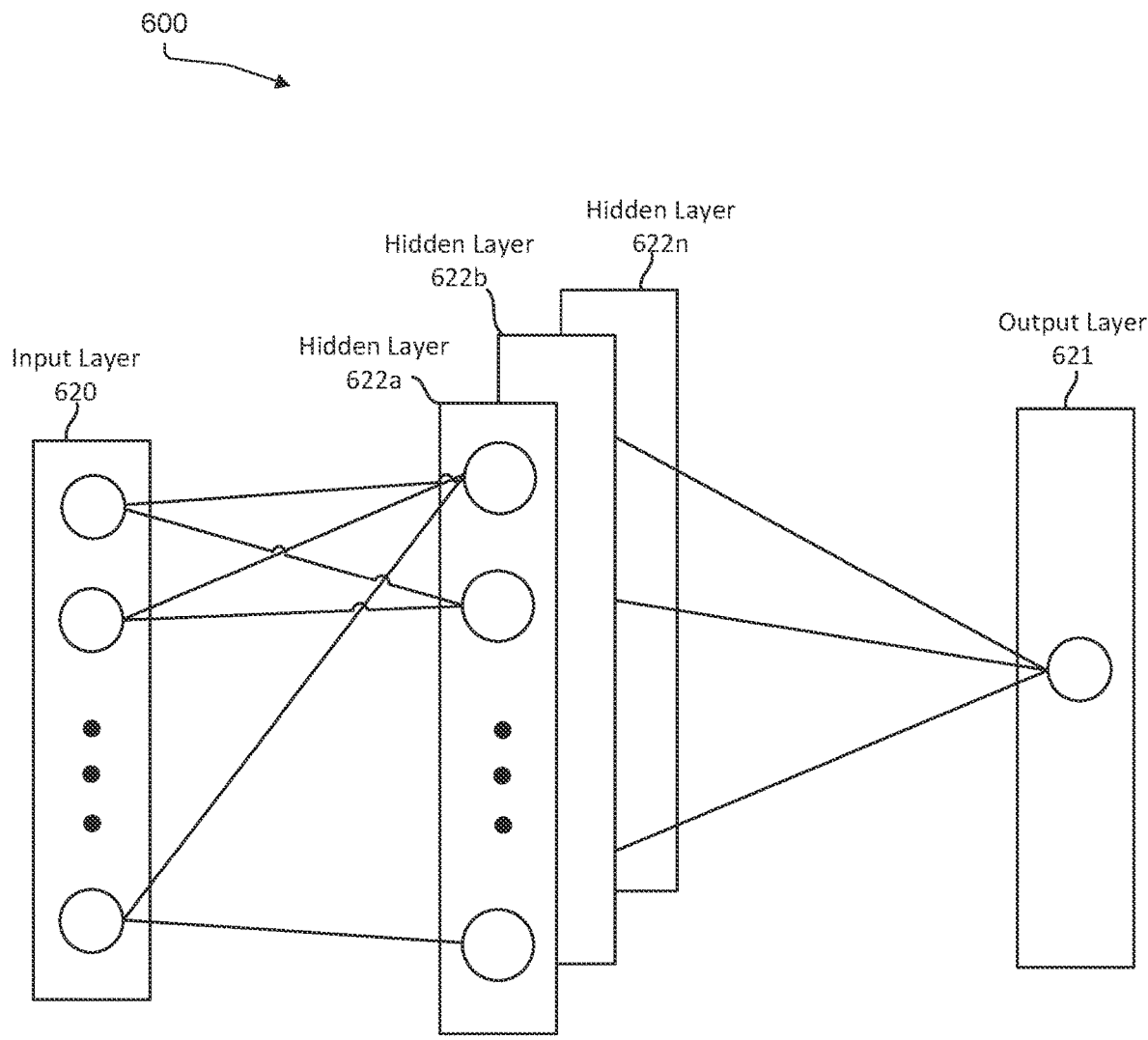
FIG. 6 is a diagram illustrating an example of a neural network architecture, according to some examples of the present disclosure.

FIG. 6 is a diagram illustrating an example of a neural network architecture 600 that can be used to implement some or all of the neural networks described herein. The neural network architecture 600 can include an input layer 620 can be configured to receive and process data to generate one or more outputs. The neural network architecture 600 also includes hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network architecture 600 further includes an output layer 621 that provides an output resulting from the processing performed by the hidden layers 622a, 622b, through 622n.

The neural network architecture 600 is a multi-layer neural network of interconnected nodes. Each node can represent a piece of information. Information associated with the nodes is shared among the different layers and each layer retains information as information is processed. In some cases, the neural network architecture 600 can include a feed-forward network, in which case there are no feedback connections where outputs of the network are fed back into itself. In some cases, the neural network architecture 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network architecture 600 are shown as having multiple output lines, a node can have a single output and all lines shown as being output from a node represent the same output value.

In some cases, each node or interconnection between nodes can have a weight that is a set of parameters derived from the training of the neural network architecture 600. Once the neural network architecture 600 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 600 to be adaptive to inputs and able to learn as more and more data is processed.

The neural network architecture 600 is pre-trained to process the features from the data in the input layer 620 using the different hidden layers 622a, 622b, through 622n in order to provide the output through the output layer 621.

In some cases, the neural network architecture 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 600 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total=\Sigma(\frac{1}{2}$ (target-output) $^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network architecture 600 can perform a backward pass by determining which inputs (weights) most contributed to the loss of the network and can adjust the weights so that the loss decreases and is eventually minimized.

The neural network architecture 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 600 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 7:
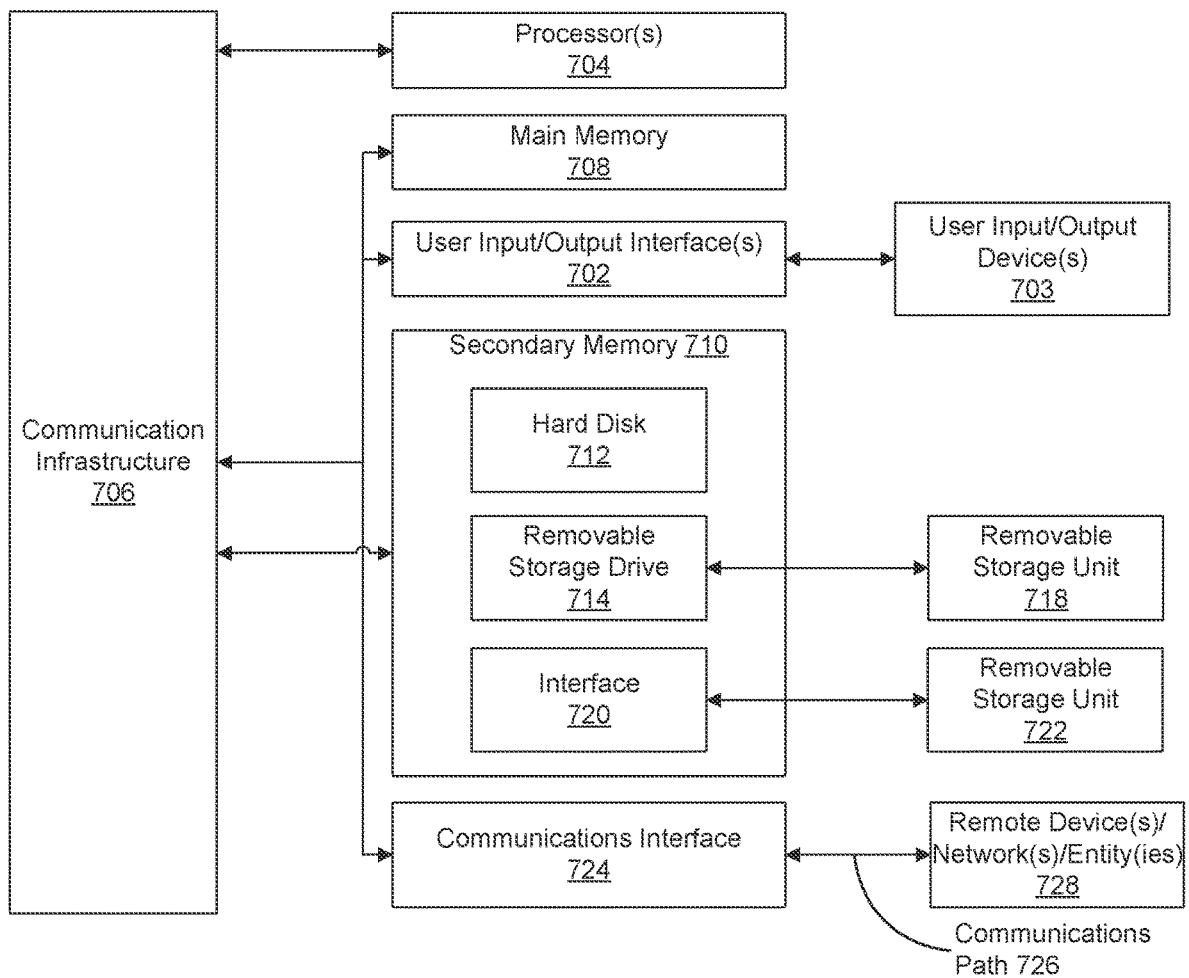
FIG. 7 illustrates an example computer system that can be used for implementing various aspects of the present disclosure.

Various aspects and examples may be implemented, for example, using one or more well-known computer systems, such as computer system 700 shown in FIG. 7. For example, the one or more edge devices of local computing system 101 and/or management computing system 110 may be implemented using combinations or sub-combinations of computer system 700. Also, or alternatively, one or more computer systems 700 may be used, for example, to implement any of the aspects and examples discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may include a communication or network interface 724. Communication interface 724 may enable computer system 700 to communicate and interact with any combination of external devices, external networks, external entities, etc. (individually and collectively referenced by reference number 728). For example, communication interface 724 may allow computer system xx00 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

For instance, each of the edge devices of local computing system, such as edge device 102, edge device 104, edge device 106, edge device 108 and edge device 109, may include one or more tangible, non-transitory memories that store data and/or software instructions and one or more processors, such as processor 704, may be configured to execute the software instructions to, for example, perform any of the example processes described herein to process sensor data of one or more edge devices of local computing system 101. The stored software instructions may, for example, include one or more application programs, one or more application modules, or other elements of code executable by the one or more processors.

In another instance, management computing system may represent a computing system that includes one or more servers and tangible, non-transitory memory devices storing executable code and application modules. The one or more servers may each include one or more processors, such as processor 704, or processor-based computing devices, which may be configured to execute portions of the stored code or application modules to perform operations consistent with the disclosed embodiments.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computing system comprising: a memory storing instructions; and at least one processor coupled to the memory, the at least one processor being configured to execute the instructions to:
   determine, via a first edge device of a plurality of edge devices of a first network, processing capabilities of each of the plurality of edge devices;
   determine, via the first edge device, available processing resources of each of the plurality of edge devices;
   select, from the plurality of edge devices, a target device, based on the processing capabilities of each of the plurality of edge devices and the available processing resources of each of the plurality of edge devices;
   and based on one or more privacy preferences that define types of information to be provided to one or more computing systems outside of the first network, communicate with the target device to cause the target device to process sensor data generated by the target device to generate one or more feature vectors of one or more objects in a corresponding environment and provide a second computing system the one or more feature vectors, the second computing system being on a second network different from the first network.

2. The computing system of claim 1, wherein the target device applies a first machine learning process to the sensor data to generate the one or more feature vectors.

3. The computing system of claim 1, wherein the at least one processor is further configured to:
   obtain the one or more privacy preferences.

4. The computing system of claim 3, wherein the one or more privacy preferences indicate the sensor data may not be transmitted to a second computing system outside of the first network.

5. The computing system of claim 3, wherein the one or more privacy preferences indicate sensor data of a second edge device of the plurality of edge devices may be transmitted to the target device, and wherein communicating with the target device further causes the target device to generate one or more feature vectors based on sensor data of the target device and sensor data of the second edge device.

6. The computing system of claim 3, wherein the one or more privacy preferences indicate at least a portion of the sensor data may be transmitted to a computing system on the second network, and wherein the at least one processor is further configured to:
   transmit, to the second computing system, the portion of the sensor data and the one or more feature vectors associated with the sensor data.

7. The computing system of claim 1, wherein the second computing system determines one or more characteristics of the one or more objects based on one or more feature vectors of known objects and the one or more feature vectors of the sensor data.

8. A computer-implemented method comprising:
   determining, via a first edge device of a plurality of edge devices of a first network, processing capabilities of each of the plurality of edge devices; determining, via the first edge device, available processing resources of each of the plurality of edge devices;
   selecting, from the plurality of edge devices, a target device, based on the processing capabilities of each of the plurality of edge devices and the available processing resources of each of the plurality of edge devices;
   and based on one or more privacy preferences that define types of information to be provided to one or more computing systems outside of the first network, communicating with the target device to cause the target device to process sensor data generated by the target device to generate one or more feature vectors of one or more objects in a corresponding environment and providing a second computing system the one or more feature vectors, the second computing system being on a second network different from the first network.

9. The computer-implemented method of claim 8, wherein the target device applies a first machine learning process to the sensor data to generate the one or more feature vectors.

10. The computer-implemented method of claim 8, wherein the method further comprises:
    obtaining the one or more privacy preferences.

11. The computer-implemented method of claim 10, wherein the one or more privacy preferences indicate the sensor data may not be transmitted to a computing system outside of the first network.

12. The computer-implemented method of claim 10, wherein the one or more privacy preferences indicate sensor data of a second edge device of the plurality of edge devices may be transmitted to the target device, and wherein communicating with the target device further causes the target device to generate one or more feature vectors based on sensor data of the target device and sensor data of the second edge device.

13. The computer-implemented method of claim 12, wherein the one or more privacy preferences indicate at least a portion of the sensor data may be transmitted to a computing system on the second network, and wherein method further comprises:
   transmitting, to the computing system, the portion of the sensor data along and the one or more feature vectors.

14. The computer-implemented method of claim 8, wherein the second computing system determines one or more characteristics of the one or more objects associated with the one or more feature vectors of the sensor data based on one or more feature vectors of known objects and the one or more feature vectors of the sensor data.

15. A tangible, non-transitory computer readable medium storing instructions that, when executed by at least one processor, cause the at least one processor to perform operations comprising: determining, via a first edge device of a plurality of edge devices of a first network, processing capabilities of each of the plurality of edge devices;
   determining, via the first edge device, available processing resources of each of the plurality of edge devices;
   selecting, from the plurality of edge devices, a target device, based on the processing capabilities of each of the plurality of edge devices and the available processing resources of each of the plurality of one or more edge devices;
   and based on one or more privacy preferences that define types of information to be provided to one or more computing systems outside of the first network, communicating with the target device to cause the target device to process sensor data generated by the target device to generate one or more feature vectors of one or more objects in a corresponding environment and providing a second computing system the one or more feature vectors, the second computing system being on a second network different from the first network.

16. The tangible, non-transitory computer readable medium of claim 15, wherein the target device applies a first machine learning process to the sensor data to generate the one or more feature vectors.

17. The tangible, non-transitory computer readable medium of claim 15, and wherein the at least one processor further performs operations comprising:
   obtaining the one or more privacy preferences.

18. The tangible, non-transitory computer readable medium of claim 17, wherein the one or more privacy preferences indicate the sensor data may not be transmitted to a computing system outside of the first network.

19. The tangible, non-transitory computer readable medium of claim 17, wherein the one or more privacy preferences indicate sensor data of a second edge device of the plurality of edge devices may be transmitted to the target device, and wherein communicating with the target device further causes the target device to generate one or more feature vectors based on sensor data of the target device and sensor data of the second edge device.

20. The tangible, non-transitory computer readable medium of claim 17, wherein the one or more privacy preferences indicate at least a portion of the sensor data may be transmitted to a computing system on the second network, and wherein method further comprises:
   transmitting, to the computing system, the portion of the sensor data along and the one or more feature vectors.

* * * * *